Oct. 27, 1925.   1,559,454
L. C. PRITNER ET AL
BENDING MACHINE
Filed Nov. 4, 1922
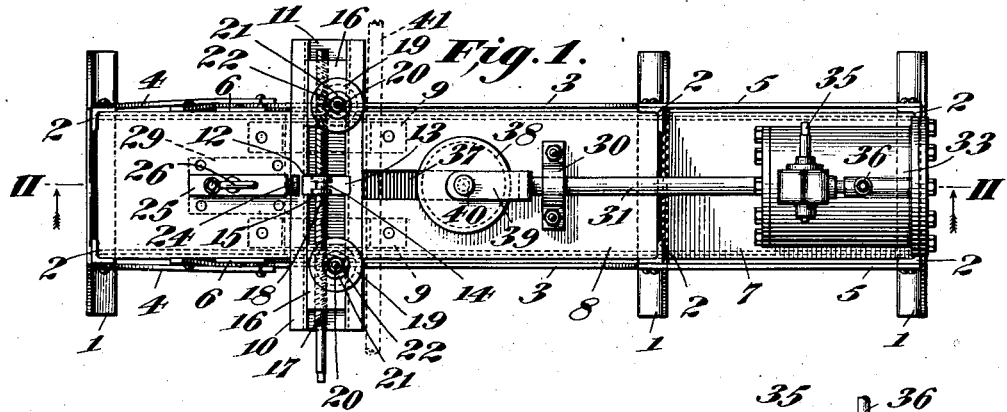
Inventors
Lindsay C. Pritner
Lewis S. Paul, and
By Geo. E. Thackray
Attorney

Patented Oct. 27, 1925.

1,559,454

UNITED STATES PATENT OFFICE.

LINDSAY C. PRITNER AND LEWIS S. PAUL, OF JOHNSTOWN, PENNSYLVANIA.

BENDING MACHINE.

Application filed November 4, 1922. Serial No. 599,099.

*To all whom it may concern:*

Be it known that we, LINDSAY C. PRITNER and LEWIS S. PAUL, citizens of Johnstown, in the county of Cambria and State of Pennsylvania, have invented certain new and useful Improvements in Bending Machines; and we do hereby declare the following to be a full, clear, and exact description of the invention, such as will enable others skilled in the art to which it appertains to make and use the same.

Our invention relates generally to a machine which is adapted to bend pipes, bars, rods, etc., into various, preferably curved, forms, such as circular bends of various radii, return bends, reverse bends, offset bends, etc., as may be necessary when fitting up work requiring such construction, thereby obviating the necessity of an unnecessary number of pipe or other fittings.

While our bender is applicable for bending pipes, rods, bars, etc., we will, for the sake of simplicity of description and illustration, herein describe it in connection with bending pipes, as this is one of its principal uses.

Our bender consists of a table or stand having legs or supports adapted to be seated on the ground or on any other convenient foundation, and the table top has two platforms, one to support a fluid pressure cylinder and the other above it to support the bending rollers, slides, guides, and stops, etc., therefor. Near one end of the table we mount a transverse guide having a grooved guideway, preferably of dove-tail section, and in this are mounted two slides or blocks conforming thereto, which carry rotatable rollers, which rollers are preferably grooved. These rollers are adjustable toward and from each other by means of a right hand and left hand screw, which is threaded in each slide and which is provided with a central thrust block which is positioned in the guide and co-operates with collars on the screw, so that the rotation of the screw in one direction will move the slides and the rollers carried thereby toward each other, and the rotation of the screw in the reverse direction will move them from each other. In the rear of these rollers and opposite the space between them is an adjustable stop member, which may be moved toward or from the rollers as desired and held in position by the engagement of saw teeth on its bottom with corresponding saw teeth on a rack secured on the table below it.

This stop member is also provided with a screw-threaded portion or stop having a projecting head, which stop may be screwed into or out of the stop member to make the final fine adjustment. At the other end of the table is mounted a fluid pressure cylinder having a piston and a slide on the end of the rod, carrying a bending roller, which may be larger than the other rollers and preferably grooved and adapted to be reciprocated toward and from the other rollers and into or adjacent to the space between them.

The pipe or rod to be bent is laid transversely of the table against the pair of adjustable rollers and the larger bending roller is projected against the pipe to bend it as desired, and in order to provide bending to different radii the adjustable rollers may be moved toward or from each other as may be desired, and the adjustable stop may be set to limit the movement as necessary.

We prefer to use rollers to contact with the pipe, as these will partially rotate as the bending operation proceeds, thereby avoiding unnecessary sliding friction and preventing distortion of the pipe, as the rollers will turn when in contact with the pipe during the process of bending in such a way as to prevent sliding contact and the abrasion or distortion which would be occasioned thereby.

Having thus given a general description of our invention, we will now, in order to make the matter more clear, refer to the annexed sheet of drawings, which forms part of this specification and in which like characters refer to like parts:—

Figure 1 is a top plan view of our improved bending machine; Fig. 2 is a vertical longitudinal sectional elevation taken on the line II—II of Fig. 1; Fig. 3 is an end elevation of the machine; Fig. 4 is a top plan view of the central portion of the guide member with the screw thrust block drawn on a larger scale, and Fig. 5 is a transverse sectional elevation through the guide member and one of the roller slides taken on the axis of one of the rollers.

Referring now to the characters of reference on the drawings:—1 are the base angles of the supporting table, 2 are the vertical legs or supports thereof, 3 are the intermediate diagonal braces, while 4 and 5 are the end diagonal braces. Gusset plates 6 are also provided, secured to the parts as indicated, which connect the braces 3 and 4 with the platform 7, which is shown as a channel, on which the operating cylinder is mounted, and with the platform or top of the table 8, which is also shown as a channel. A guide member 10 is provided extending transversely of the table and this is held in position by the keepers 9 as illustrated, and in this guide member a guideway groove 11 of dove-tail section is provided. Near the central portion of the guide member we provide notches or grooves 12, in which the ends of the thrust block 13 are set to hold it in position. The thrust block 13 is provided with a recess 14 with portions 15 of larger size, all so shaped as to receive the collared portion of the adjusting screw 17 and the thrust collars 18 thereof. The adjusting screw 17 is right and left screw threaded in the roller holder slides 16, of which two are provided, adapted to be seated and slide in the guide groove 11 of the guide member 10. On each of these slides 16 a roller 19 is mounted, this roller preferably having a grooved periphery of size adapted to substantially fit the pipe to be bent to prevent distortion thereof. Each of these rollers is mounted upon a journal bolt 20, which is screw threaded into the slide 16 as illustrated, and the rollers are held in position thereon by means of the washer 21 and the nut 22. The journal bolts are further provided with collars 23 adapted to be screwed firmly against the tops of the slides 16.

A stop member 25 is provided, the lower surface of which has saw teeth, the forward edges of which are substantially vertical, while the rear edges of the same are sloping. In the front part of this stop member is an adjusting stop 24, screw threaded therein and provided with a head portion as illustrated, and this serves as a stop for the movement of the pipe when bending and can be finely adjusted by means of its screw thread to any distance required from the plane of the axes of the adjustable rollers 19. A convenient handle 26 is provided whereby the stop member 25 may be lifted and moved forward or backward to any position desired, whereupon it is held by means of the dentate construction of its bottom which has a plurality of saw teeth in co-operation with corresponding saw teeth 28 on the stop rack 29, which is secured to the table platform below it. At the other end the table is provided a fluid pressure cylinder 33 having a piston 32 and a piston rod 31, which is held in alignment during its stroke by the keeper 30. The cylinder is provided with a slide valve 34 having a stem 35, which may be provided with an operating wheel or handle (not shown).

Fluid is supplied to the cylinder by means of the fluid pressure pipe 36. The table top 8 is provided with a slot 37 therein, in which the lower portion of the bifurcated end or slide 39 of the piston rod is adapted to fit and slide, thereby further maintaining the alignment of the larger bending roller 38, which is rotatably mounted therein on the pin 40. The roller is shown of larger diameter and may also have a grooved periphery adapted to substantially fit the pipe to be bent. As illustrated in dotted lines in Fig. 1, 41 indicates a portion of the pipe to be bent.

Having thus described our invention we will now explain its operation:—When desired to bend a pipe the amount of offset therein is determined and the stop member 28 is set in position to correspond therewith, and the final adjustment may be made by screwing in or out the stop 24. The adjustable rollers 19 are then set in position as desired by turning the adjusting screw 17 in either direction as desired by means of a crank or wheel secured on the operator's end thereof (not shown). The pipe is then laid against the pair of adjustable grooved rollers 19, and the fluid pressure cylinder is operated in such a way as to project the bending roller 38 against it and this forces it between or partially between the adjustable rollers 19, the movement thereof being limited by the stop 24. The bending roller is then withdrawn by a reverse movement of the piston and the pipe may be moved in any direction and the operation continues in such a way as to shape the pipe to any bend or offset desired.

Although we have shown and described our invention in considerable detail, we do not wish to be limited to the exact and specific details thereof as shown and described; but may use such modifications in, substitutions for, or equivalents thereof as are embraced within the scope of our invention, or as pointed out in the claims.

Having thus described our invention, what we claim and desire to secure by Letters Patent is:—

1. A bending machine comprising a platform, a grooved guide mounted thereon, a pair of slides mounted in the groove of said guide, a roller rotatably mounted on each slide, means for moving said slides toward and from each other, a reciprocable roller adapted to be moved toward or from the pair of adjustable rollers, and an adjustable stop in the rear of and between said adjustable rollers.

2. A bending machine comprising a platform, a grooved guide mounted thereon, a plurality of slides mounted in said groove, a right hand and left hand threaded screw, threaded in said guides, an intermediate thrust bearing co-operating with said screw adapted to hold it from endwise movement, rollers rotatably mounted on each of said slides, and a bending roller adapted to be moved toward and from said adjustable rollers.

3. A bending machine comprising a platform, a grooved guide mounted thereon, a plurality of slides mounted in said groove, a right hand and left hand threaded screw, threaded in said guides, an intermediate thrust bearing mounted in said guide, cooperating with said screw, and adapted to hold it from endwise movement, rollers rotatably mounted on each of said slides, a bending roller adapted to be moved toward and from said adjustable rollers, a stop member in the rear of said adjustable rollers, and means for adjusting the position of the same.

4. In a bending machine of the character described, the combination of a pair of adjustable rollers and a bending roller adapted to be projected toward or retracted therefrom, of an adjustable stop provided with saw teeth on its bottom surface, and a rack with corresponding saw teeth fixed on the machine, whereby the stop member may be quickly adjusted to any predetermined distance from the rollers.

5. In a bending machine of the character described, the combination with a pair of adjustable rollers and a bending roller adapted to be projected toward or retracted therefrom, of an adjustable stop mounted thereon provided with saw teeth on its bottom surface, a rack with corresponding saw teeth fixed on the machine, whereby the stop member may be quickly adjusted to any predetermined distance from the rollers, and a screw-threaded stop mounted in said stop member and having a head portion projecting therefrom, whereby an exact and speedy adjustment of the stop may be accomplished.

6. A bending machine comprising a platform, a grooved guide mounted thereon, a pair of slides mounted in said groove, a right hand and left hand threaded screw adapted to operate in said slides, a fixed intermediate thrust bearing for said screw adapted to prevent its endwise movement, a bending roller rotatably mounted on each slide adjustable toward and from each other by the rotation of said screw, a stop member in the rear of and between said rollers, adjustable in position with respect thereto, and a fluid pressure actuated roller on the other side of said adjustable rollers, adapted to be moved toward and from said rollers as desired.

In witness whereof we hereunto affix our signatures.

LINDSAY C. PRITNER.
LEWIS S. PAUL.